United States Patent
Namuduri et al.

(10) Patent No.: US 10,044,297 B2
(45) Date of Patent: Aug. 7, 2018

(54) METHOD AND APPARATUS FOR CONTROLLING AN ELECTRIC MOTOR OF A COOLING FAN

(71) Applicant: GM GLOBAL TECHNOLOGY OPERATIONS LLC, Detroit, MI (US)

(72) Inventors: Chandra S. Namuduri, Troy, MI (US); Rajeev Vyas, Rochester Hills, MI (US); Fausto Eleazar Vazquez Flores, Edo Mex (MX); Mark J. Rychlinski, Farmington Hills, MI (US); Varsha Sadekar, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 15/358,179

(22) Filed: Nov. 22, 2016

(65) Prior Publication Data
US 2017/0163181 A1 Jun. 8, 2017

Related U.S. Application Data

(60) Provisional application No. 62/263,098, filed on Dec. 4, 2015.

(51) Int. Cl.
*G06F 7/00* (2006.01)
*H02P 6/06* (2006.01)
(Continued)

(52) U.S. Cl.
CPC .............. *H02P 6/06* (2013.01); *B60L 1/003* (2013.01); *F01P 7/10* (2013.01); *H02P 6/14* (2013.01);
(Continued)

(58) Field of Classification Search
CPC .. H02P 29/20; H02P 6/14; H02P 27/08; B60L 1/003; F01P 7/10
(Continued)

(56) References Cited

U.S. PATENT DOCUMENTS

| 4,425,766 A * | 1/1984 | Claypole ................. F01P 7/048 123/41.12 |
| 4,881,494 A * | 11/1989 | Ishigami ................ B60K 11/06 123/41.12 |

(Continued)

FOREIGN PATENT DOCUMENTS

JP 2009184377 A * 8/2009

*Primary Examiner* — Maceeh Anwari
(74) *Attorney, Agent, or Firm* — Quinn IP Law

(57) ABSTRACT

A vehicle including a cooling fan that is rotatably coupled to an electric motor that is electrically powered by a DC power source via an inverter is described. A method for controlling the cooling fan includes monitoring, via a first controller, a vehicle speed, and selecting a preferred operating state for the electric motor based upon the vehicle speed. The preferred operating state includes one of a first command associated with controlling the cooling fan to force air through the cooling system, a second command associated with a fan brake request, and a third command associated with an energy recovery mode. A discrete message from the first controller is communicated to an inverter controller, wherein the discrete message is based upon the preferred operating state for the electric motor. The inverter controller controls the inverter to control the electric motor in response to the discrete message.

16 Claims, 2 Drawing Sheets

(51) Int. Cl.
  *H02P 27/08* (2006.01)
  *H02P 29/20* (2016.01)
  *H02P 6/14* (2016.01)
  *F01P 7/10* (2006.01)
  *B60L 1/00* (2006.01)
  *B60K 11/02* (2006.01)

(52) U.S. Cl.
  CPC .............. *H02P 27/08* (2013.01); *H02P 29/20* (2016.02); *B60K 11/02* (2013.01); *B60L 2240/12* (2013.01); *B60L 2240/445* (2013.01); *F01P 2025/66* (2013.01); *F01P 2037/00* (2013.01); *Y02T 10/642* (2013.01); *Y02T 90/16* (2013.01)

(58) Field of Classification Search
  USPC .......................................................... 701/36
  See application file for complete search history.

(56) References Cited

U.S. PATENT DOCUMENTS

| | | | | |
|---|---|---|---|---|
| 5,445,128 A | * | 8/1995 | Letang | B60K 31/045 |
| | | | | 123/436 |
| 5,623,835 A | * | 4/1997 | Layman | B60H 1/00764 |
| | | | | 123/41.11 |

* cited by examiner

METHOD AND APPARATUS FOR CONTROLLING AN ELECTRIC MOTOR OF A COOLING FAN

CROSS-REFERENCE TO RELATED APPLICATIONS

This application claims the benefit of U.S. Provisional Patent Application No. 62/263,098 filed on Dec. 4, 2015, the disclosure of which is hereby incorporated by reference.

TECHNICAL FIELD

This disclosure is related to electric motors of cooling fans, and methods and systems for controlling operation thereof.

BACKGROUND

Vehicles employ fans that are powered by electric motors to move air as part of cooling systems. Known electric motors for fans may employ pulsewidth-modulated control to control the fan speed. During high-way cruising conditions, the electric motor may be switched off when sufficient ram air is available to maintain engine coolant temperature within predetermined limits. However, ambient airflow across the fan may cause it to rotate. Such operation may deflect airflow, and the fan and electric motor may operate as a generator. Known systems may employ a blocking diode in series with a DC power bus of a drive circuit for the electric motor to prevent back-feeding of electric power onto the DC power bus. Back-feeding of electric power is due to the induced voltage in the motor windings (often referred to as back-electromotive force, or back-EMF) exceeding the voltage applied to the motor controller DC input. Use of a blocking diode may result in overvoltage at the electric drive terminals under certain operating conditions, e.g., highway vehicle speeds, due to back-EMF that is generated by a windmill effect on the electric motor. Furthermore, use of a blocking diode on the DC power bus may cause conduction losses and reduce system efficiency.

SUMMARY

A vehicle including a cooling fan that is rotatably coupled to an electric motor that is electrically powered by a DC power source via an inverter is described. A method for controlling the cooling fan includes monitoring, via a first controller, a vehicle speed, and selecting, via the first controller, a preferred operating state for the electric motor based upon the vehicle speed. The preferred operating state includes one of a first command associated with controlling the cooling fan to force air through the cooling system, a second command associated with a fan brake request, and a third command associated with an energy recovery mode. A discrete message from the first controller is communicated to an inverter controller, wherein the discrete message is based upon the preferred operating state for the electric motor. The inverter controller controls the inverter to control the electric motor in response to the discrete message.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. Any directional terms are not to be construed to limit the scope of the disclosure in any manner. Furthermore, the disclosure, as illustrated and described herein, may be practiced in the absence of any element which is not specifically disclosed herein.

Figure 1:
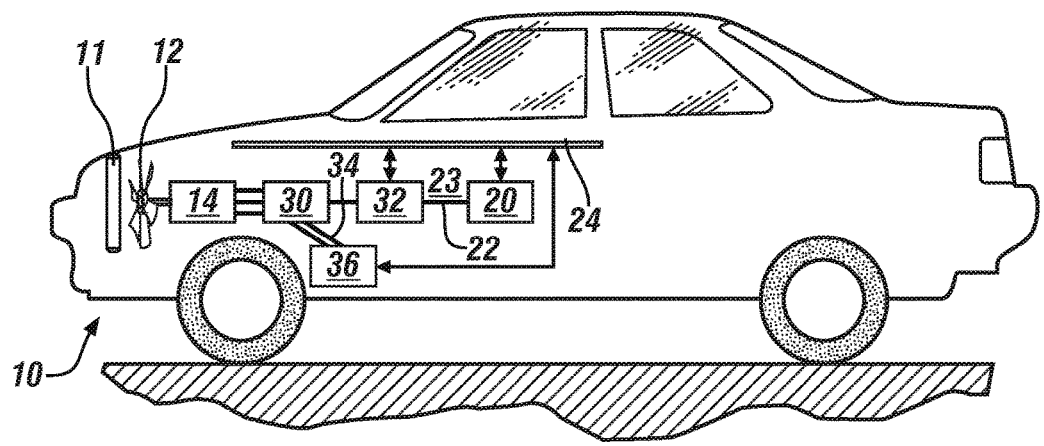
FIGS. 1 and 2 schematically illustrate a vehicle including a cooling system that includes a fluid-air heat exchanger and an electric motor and fan disposed to pump air therethrough, in accordance with the disclosure.
Figure 2:
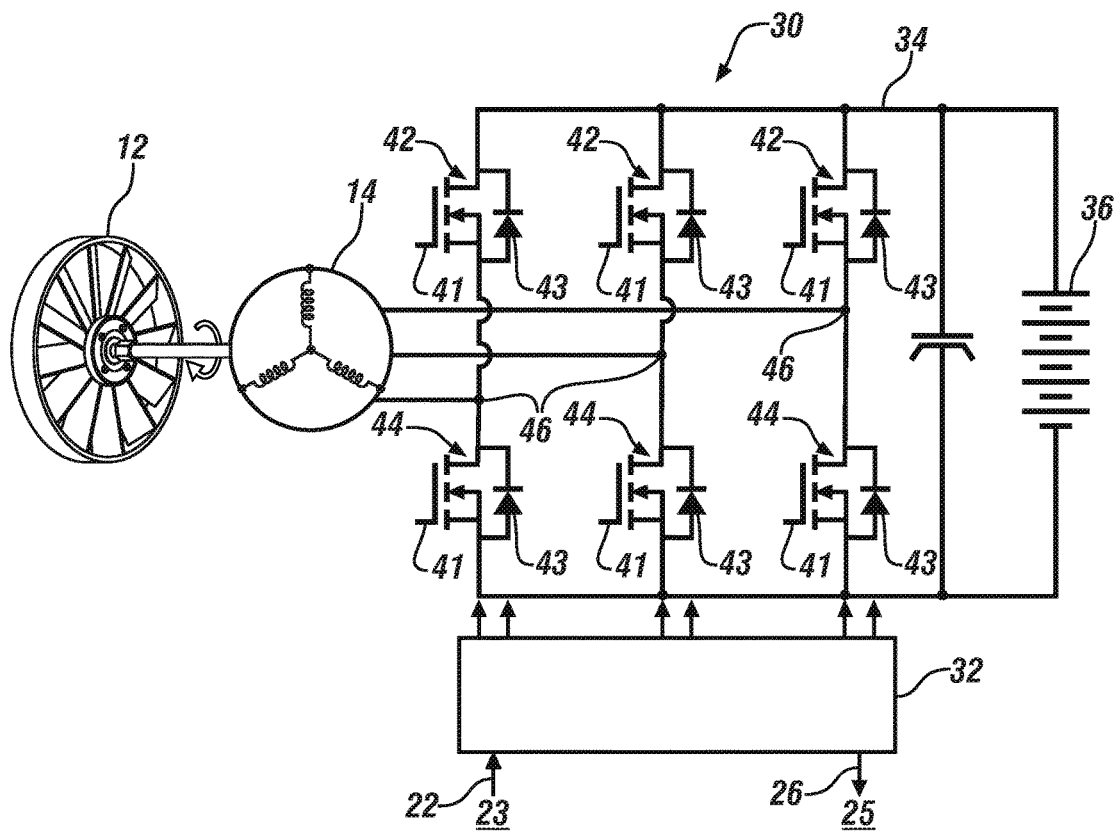

Referring now to the drawings, wherein the depictions are for the purpose of illustrating certain exemplary embodiments only and not for the purpose of limiting the same, FIGS. 1 and 2 schematically illustrate pertinent elements of a vehicle 10 including a cooling system that includes a fluid-air heat exchanger (radiator) 11 and a fan 12 disposed to pump air therethrough. Like numerals refer to like elements throughout the various illustrations. The fan 12 is mounted on a shaft element that mechanically couples to an electric motor 14. In certain embodiments, the cooling system including the radiator 11 and fan 12 is employed to manage heat transfer for an internal combustion engine, although the concepts described herein are not so limited. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

A multi-phase inverter circuit (inverter) 30 is disposed to control electric power flow to the electric motor 14 to control rotation of the fan 12. An inverter controller 32 communicates with the inverter 30 to control its operation. A first controller 20 is configured to directly communicate a first discrete message 23 via a communication port of the inverter controller 32, preferably employing a single discrete pointto-point communication link 22. The first controller 20 may also be configured to directly receive a second discrete message 25 describing the status of the fan 12 via a communication port of the inverter controller 32, preferably employing a second single discrete point-to-point communication link 26. Alternatively, the first controller 20 may be configured to directly communicate the first discrete message 23 to a communication port of the inverter controller 32 employing a wireless connection. Furthermore, the inverter controller 32 and the first controller 20 may be configured to communicate bi-directionally via a local area network ("LAN") communication bus 24.

The electric motor 14 may be any suitable electric motor/generator device, e.g., a multi-phase brushless DC electric motor. The inverter 30 electrically connects via an electrical bus 34 to a DC power source 36 such as a generator and/or battery, and communicates with an inverter controller 32. In one embodiment, the DC power source 36 supplies electric power to the electrical bus 34. The electric power may be rated to have a system voltage that is nominally rated at 12 Vdc, 24 Vdc, 36 Vdc, 48 Vdc, or another suitable voltage rating. The DC power source 36 may include an electrical energy storage device, e.g., a multi-cell battery or a capacitor, or another suitable device or system. The inverter 30 includes a plurality of switch pairs including high-side switches 42 and low-side switches 44. The high-side switches 42 and low-side switches 44 electrically connect in series at junctions 46 across positive and negative rails of the electrical bus 34, and the junctions 46 electrically connect to the electric motor 14 to transfer electric power thereto. As shown, the electric motor 14 and inverter 30 are configured as three-phase devices, with corresponding three sets of the high-side switches 42 and low-side switches 44. Each of the high-side switches 42 and low-side switches 44 includes a power transistor 41 electrically arranged in parallel with a diode 43. Each of the power transistors 41 may be any suitable power transistor, e.g., an Insulated Gate Bipolar Transistor (IGBT) or a field-effect transistor (FET) that is preferably rated for continuous motor stall current. Each of the switch pairs 42, 44 corresponds to one of the phases of the electric motor 14. The inverter 32 preferably includes other electrical components including capacitors, resistors and other electrical circuit components to accomplish functions related to electrical noise suppression, current sensing, voltage sensing, temperature sensing, protection and the like.

The inverter controller 32 preferably includes a central processing unit, a memory device, controller-executable instruction sets, and input/output circuit(s) and devices including gate drivers that communicate with each of the power transistors 41 to control switching thereof. The input/output circuit receives the first discrete message 23 that is communicated via the discrete point-to-point communication link 22. The controller-executable instruction set includes instructions to interpret the first discrete message 23 that is communicated via the discrete point-to-point communication link 22 and command operation of the gate drivers to control switching of the power transistors 41 in response. Such commanded operation of the gate drivers is preferably in the form of a pulsewidth-modulated (PWM) signal having a frequency (Hz) and a duty cycle (%). The first discrete message 23 that is communicated from the first controller 20 to the inverter controller 32 via the discrete point-to-point communication link 22 is also preferably in the form of a pulsewidth-modulated (PWM) signal having a frequency (Hz) and a duty cycle (%) that may be interpreted by the inverter controller 32.

The first controller 20 is preferably configured to monitor vehicle operation, including parameters related to vehicle speed, operator requests for propulsion, and other control states. The first controller 20 is also configured to execute control routines, including control routines to generate commands for operating the electric motor 14. Example routines are described with reference to FIGS. 3 and 4. In an exemplary embodiment, the first controller 20 may be an Engine Control Module (ECM) or part thereof.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. Data signals may include signals representing inputs from sensors, signals representing actuator commands, and communications signals between controllers.

Figure 3:
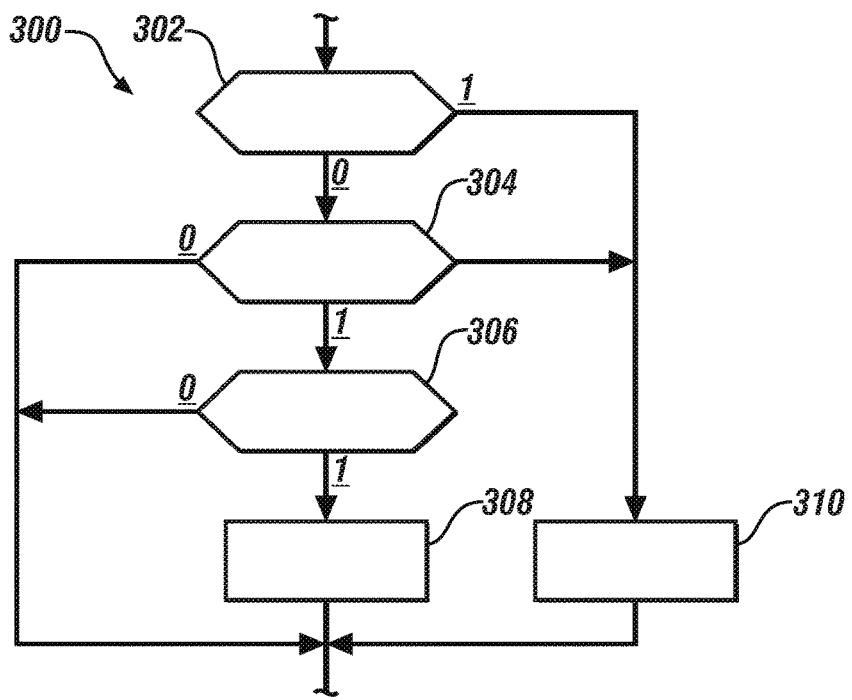
FIG. 3 schematically shows a fan braking control routine for controlling operation of an embodiment of an electric motor and fan that is disposed on the vehicle described with reference to FIGS. 1 and 2, in accordance with the disclosure.

FIG. 3 schematically shows a fan braking control routine 300 for controlling operation of an embodiment of the electric motor 14 and fan 12 that is disposed on the vehicle 10 as described with reference to FIGS. 1 and 2. The fan braking control routine 300 is preferably periodically executed in the first controller 20, and includes commanding operation to apply a braking torque on the electric motor 14 to prevent freewheeling of the fan 12 due to ram-air flow during specific vehicle operating conditions. The use of braking torque is intended to avoid or minimize risk of generating back-EMF in the inverter 30 caused by freewheeling of the fan 12. Those skilled in the art appreciate that uncontrolled back-EMF may lead to over-voltage conditions through the inverter 30, the electrical bus 34, and/or the DC power source 36 that may negatively affect service life of one or more components. Table 1 is provided as a key wherein the numerically labeled blocks and the corresponding functions are set forth as follows, corresponding to the fan braking control routine 300.

TABLE 1

| BLOCK | BLOCK CONTENTS |
|---|---|
| 302 | Is fan request ON? |
| 304 | Is fan request = BRAKE? |
| 306 | Is vehicle speed greater than S0 threshold? |
| 308 | Command fan brake mode |
| 310 | Command fan operation to generate air flow |

Under low speed vehicle operating conditions, the electric motor 14 may be commanded OFF to minimize electric power consumption. However, there may be a request to operate the fan 12 to effect airflow through the radiator 11. During execution of each iteration of the fan braking control routine 300, it is determined whether the fan request is ON (302), and if so (1), a first command F1 is generated to operate the electric motor 14 to operate the fan 12 to effect airflow through the radiator 11 (310). The first command F1 is communicated to the inverter controller 32 as a first discrete message 23 via the discrete point-to-point communication link 22. The inverter controller 32 interprets the first discrete message 23 to determine the first command F1, and controls operation of the inverter 30 in response.

When the fan request is OFF (302)(0), the routine 300 determines whether a fan brake request is active (304), and if not (0), this iteration of the routine 300 ends without further action, thus permitting the fan 12 to freewheel. When the fan brake request is active (304)(1), vehicle speed is compared to a first minimum threshold speed S0 (306). If the vehicle speed is less than the first minimum threshold speed S0 (306)(0), this iteration of the routine 300 ends without further action, thus permitting the fan 12 to freewheel. The first minimum threshold speed S0 may be calibrated at a vehicle speed threshold that minimizes likelihood that freewheeling of the fan 12 will generate back-EMF in the inverter 30 that leads to over-voltage conditions that may negatively affect service life of one or more components of the inverter 30 or another unpredictable system response that may occur elsewhere in the system.

When the vehicle speed is greater than the first minimum threshold speed S0 (306)(1), a second command F0 is generated to brake the fan 12 to stop its rotation (308). The second command F0 is preferably communicated to the inverter controller 32 as a first discrete message 23 via the discrete point-to-point communication link 22. The inverter controller 32 interprets the first discrete message 23 to determine the second command F0, and controls operation of the inverter 30 in response. Controlling operation of the inverter 30 to effect the second command F0 to brake the fan 12 may include simultaneously activating all of the high-side switches 42, or simultaneously activating all of the low-side switches 44. Simultaneously activating all of the high-side switches 42, or simultaneously activating all of the low-side switches 44 serves to short-circuit the electrical leads to the electric motor 14 to achieve a braking torque on the fan shaft that prevents the fan 12 from rotating, without drawing any power from the DC power source 36.

By way of a non-limiting example, the first discrete message 23 that is communicated from the first controller 20 to the inverter controller 32 via the discrete point-to-point communication link 22 may have the following format. The frequencies, duty cycles, and fan speeds are illustrative of one embodiment, and are non-limiting.

| | Discrete Message | | |
|---|---|---|---|
| Command | Frequency (Hz) | Nominal PWM Duty Cycle (%) | Control operation in the inverter controller |
| F1 - Operate Fan | 100 | 10 | 500 RPM |
| F1 - Operate Fan | 100 | 20 | 1000 RPM |
| F1 - Operate Fan | 100 | 30 | 1500 RPM |
| F1 - Operate Fan | 100 | 40 | 2000 RPM |
| F0 - Brake Fan | 200 | 25 | Activate low-side switches |
| F0 - Brake Fan | 200 | 50 | Activate high-side switches |

As such, there may be benefits to minimizing the air-flow deflection by the fan 12 during highway cruising conditions when the fan 12 is not commanded ON, by commanding application of a braking torque on the electric motor 14 to prevent freewheeling of the fan 12 due to ram-air flow, and thus prevent overvoltage caused by motor back-EMF. Such operation also minimizes audible noise generated by the fan 12 when it is not commanded ON.

Figure 4:
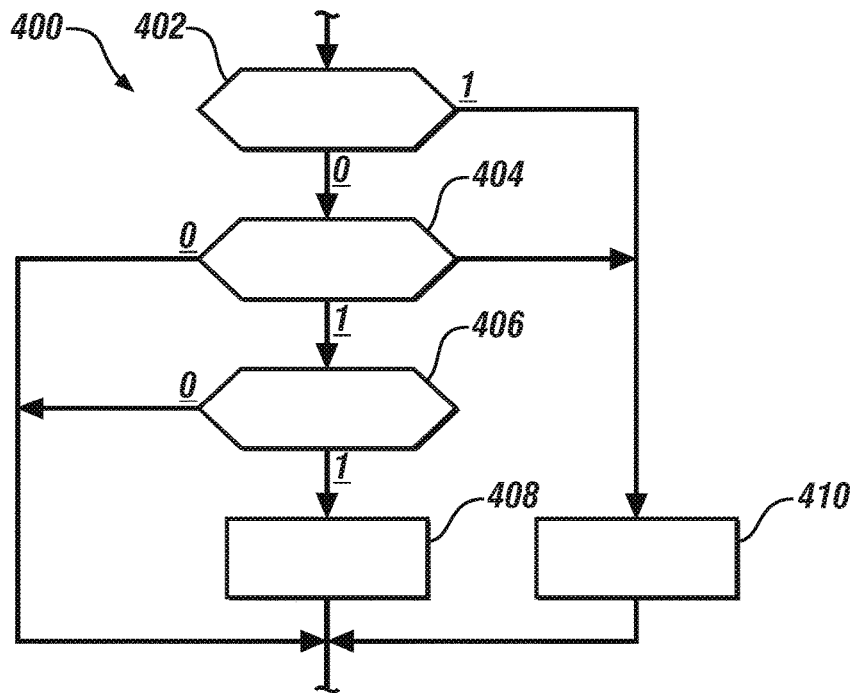
FIG. 4 schematically shows a fan energy recovery control routine for controlling operation of an embodiment of and electric motor and fan that is disposed on the vehicle as described with reference to FIGS. 1 and 2, in accordance with the disclosure.

FIG. 4 schematically shows a fan energy recovery control routine 400 for controlling operation of an embodiment of the electric motor 14 and fan 12 that is disposed on the vehicle 10 as described with reference to FIGS. 1 and 2. The fan energy recovery control routine 400 is preferably periodically executed in the first controller 20, and includes commanding operation to apply a reactive torque on the electric motor 14 to generate electric power through the fan 12 due to ram-air flow during specific vehicle operating conditions. Table 2 is provided as a key wherein the numerically labeled blocks and the corresponding functions are set forth as follows, corresponding to the fan energy recovery control routine 400.

TABLE 2

| BLOCK | BLOCK CONTENTS |
|---|---|
| 402 | Is fan request ON? |
| 404 | Is fan request = GENERATOR? |
| 406 | Is vehicle speed greater than S1 threshold? AND Is Vin < V1? |
| 408 | Command energy recovery mode F2 |
| 410 | Command fan operation to generate air flow F1 |

Under low speed vehicle operating conditions, the electric motor 14 may be commanded OFF to minimize electric power consumption. However, there may be a request to operate the fan 12 to effect airflow through the radiator 11. During execution of each iteration of the fan energy recovery control routine 400, it is determined whether the fan request is ON (402), and if so (1), a first command F1 is generated to operate the electric motor 14 to operate the fan 12 to effect airflow through the radiator 11 (410). The first command F1 is communicated to the inverter controller 32 as a first discrete message 23 via the discrete point-to-point communication link 22. The inverter controller 32 interprets the first discrete message 23 to determine the first command F1, and controls operation of the inverter 30 in response.

When the fan request is not ON (402)(0), the routine 400 determines whether a fan generator mode is active (404), and if not (0), this iteration of the routine 300 ends without further action, thus permitting the fan 12 to freewheel. When the fan generator mode is active (404)(1), vehicle speed is compared to a second minimum threshold speed S1, and system voltage Vin is compared to a maximum permissible system voltage V1 (406). If the vehicle speed is less than the second minimum threshold speed S1 or the system voltage Vin is greater than the maximum permissible system voltage V1 (406)(0), this iteration of the routine 400 ends without further action, thus permitting the fan 12 to freewheel. The second minimum threshold speed S1 may be calibrated at a vehicle speed threshold that permits generating sufficient energy to effect charging of the DC power source 36.

When the vehicle speed is greater than the second minimum threshold speed S1 and the system voltage Vin is less than the maximum permissible system voltage V1 (406)(1), an energy recovery mode F2 is commanded to operate the fan 12 and inverter 30 to generate electric power (408), e.g., by rectifying electric power from the electric motor 14 through activation of selected switches 42, 44 of the inverter 30.

The energy recovery mode F2 is communicated to the inverter controller 32 as a first discrete message 23 via the discrete point-to-point communication link 22. The inverter controller 32 interprets the first discrete message 23 to determine the energy recovery mode F2, and controls operation of the inverter 30 in response. Controlling operation of the inverter 30 to effect operation in the energy recovery mode F2 to generate electric power through the fan 12 in a manner to provide a predictable magnitude of power recovery includes operating the inverter 30 as a rectifier to generate usable electric power. Operating the inverter 30 as a rectifier may include commanding a PWM frequency and duty cycle for the inverter 30 that generates a desired magnitude of electric power, e.g., 1 amp, 2 amps or another power.

By way of a non-limiting example, the first discrete message 23 that is communicated from the first controller 20 to the inverter controller 32 via the discrete point-to-point communication link 22 may have the following format. The frequencies, duty cycles, and fan speeds are illustrative of one embodiment, and are non-limiting.

| | Discrete Message | | |
|---|---|---|---|
| Command | Frequency (Hz) | Nominal PWM Duty Cycle (%) | Control operation in the inverter controller |
| F1 - Operate Fan | 100 | 10 | 500 RPM |
| F1 - Operate Fan | 100 | 20 | 1000 RPM |
| F1 - Operate Fan | 100 | 30 | 1500 RPM |
| F1 - Operate Fan | 100 | 40 | 2000 RPM |
| F2 - Energy recovery mode | 50 | 10 | Generate 1 amp of DC current that is transferred to electrical bus 34 |
| F2 - Energy recovery mode | 50 | 20 | Generate 2 amps of DC output current that is transferred to electrical bus 34 |

Alternatively, the first discrete message 23 includes a message having a first pulsewidth-modulated (PWM) duty cycle that is associated with the first command F1, a second PWM duty cycle that is associated with the second command F0, and a third PWM duty cycle that is associated with the third command F2.

As such, there may be benefits to minimizing the air-flow deflection by the fan 12 during highway cruising conditions when the fan 12 is not commanded ON, by commanding application of a braking torque on the electric motor 14 to prevent freewheeling of the fan 12 due to ram-air flow, and thus prevent overvoltage caused by motor back-EMF. Such operation also minimizes audible noise generated by the fan 12 when it is not commanded ON.

The electric motor for the fan may operate as a generator when the fan is not required to be operational during highway cruising conditions to increase a state of charge of the DC power source 36. This may result in reduced alternator loading, optimized electrical component sizing and improved electrical energy management.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a cooling fan of a vehicle, wherein the cooling fan is rotatably coupled to an electric motor that is electrically powered by a DC power source via an inverter, the method comprising:
   monitoring, via a first controller, a vehicle speed;
   selecting, via the first controller, a preferred operating state for the electric motor based upon the vehicle speed, wherein the preferred operating state includes one of a first command associated with controlling the cooling fan to force air through the cooling system, a second command associated with a fan brake request, and a third command associated with an energy recovery mode, including selecting the second command associated with the fan brake request when the vehicle speed is greater than a first minimum threshold speed, wherein the first minimum threshold speed is selected to avoid a magnitude of back-EMF in the inverter that is associated with an over-voltage condition;
   communicating a discrete message from the first controller to an inverter controller, wherein the discrete message is based upon the preferred operating state for the electric motor, wherein the inverter controller comprises a plurality of switch pairs including high-side switches and low-side switches electrically connected in series, and wherein the inverter controller controls the inverter by simultaneously activating all of the high-side switches in response to the second command to effect the fan brake request and prevent the fan from rotating without drawing power from the DC power source; and controlling, via the inverter controller, the inverter to control the electric motor in response to the discrete message.

2. The method of claim 1, comprising selecting the first command associated with controlling the cooling fan to force air through the cooling system to manage heat transfer for an internal combustion engine of the vehicle.

3. The method of claim 1, wherein the inverter controller comprises a plurality of switch pairs including high-side switches and low-side switches electrically connected in series, and wherein the inverter controller controls the inverter by simultaneously activating all of the low-side switches in response to the second command to effect the fan brake request and prevent the fan from rotating without drawing power from the DC power source.

4. The method of claim 1, further comprising permitting the fan to freewheel when the vehicle speed is less than the first minimum threshold speed.

5. The method of claim 1, comprising selecting the third command associated with the energy recovery mode to react ambient air flow across the cooling fan to generate electric power when the vehicle speed is greater than a second minimum threshold speed and a system voltage that is supplied by the DC power source is less than a maximum system voltage.

6. The method of claim 5, further comprising permitting the fan to freewheel when the vehicle speed is less than the second minimum threshold speed.

7. The method of claim 5, further comprising permitting the fan to freewheel when the system voltage that is supplied by the DC power source is greater than the maximum system voltage.

8. The method of claim 5, wherein the second minimum threshold speed is associated with generating sufficient energy to effect charging of the DC power source.

9. A vehicle, comprising:
a cooling fan rotatably coupled to an electric motor that is electrically powered by a DC power source via an inverter,
an inverter controller configured to control operation of the inverter, wherein the inverter controller comprises a plurality of switch pairs including high-side switches and low-side switches electrically connected in series, and wherein the inverter controller controls the inverter by simultaneously activating all of the high-side switches in response to the second command to effect the fan brake request and prevent the fan from rotating without drawing power from the DC power source;
a first controller configured to monitor operation of the vehicle;
a single, discrete, point-to-point communication link disposed between a communication port of the inverter controller and a communication port of the first controller, the first controller including an instruction set executable to:
monitor vehicle speed,
select a preferred operating state for the electric motor based upon the vehicle speed, wherein the preferred operating state includes one of a first command associated with controlling the cooling fan to force air through the cooling system, a second command associated with a fan brake request, and a third command associated with an energy recovery mode, wherein the second command associated with the fan brake request is selected when the vehicle speed is greater than a first minimum threshold speed, wherein the first minimum threshold speed is selected to avoid a magnitude of back-EMF in the inverter that is associated with an over-voltage condition, and
communicate a discrete message to the inverter controller via the single, discrete, point-to-point communication link, wherein the discrete message is based upon the preferred operating state for the electric motor; and
the inverter controller including an instruction set executable to control the inverter to control the electric motor in response to the discrete message.

10. The vehicle of claim 9, wherein the first command is associated with controlling the cooling fan to force air through the cooling system to manage heat transfer for an internal combustion engine of the vehicle.

11. The vehicle of claim 9, wherein the inverter controller comprises a plurality of switch pairs including high-side switches and low-side switches electrically connected in series, and wherein the inverter controller controls the inverter by simultaneously activating all of the low-side switches in response to the second command to effect the fan brake request and prevent the fan from rotating without drawing power from the DC power source.

12. The vehicle of claim 9, wherein the fan is permitted to freewheel when the vehicle speed is less than the first minimum threshold speed.

13. The vehicle of claim 9, wherein the third command associated with the energy recovery mode is selected to react ambient air flow across the cooling fan to generate electric power when the vehicle speed is greater than a second minimum threshold speed and a system voltage that is supplied by the DC power source is less than a maximum system voltage.

14. The vehicle of claim 13, further comprising the fan being permitted to freewheel when the vehicle speed is less than the second minimum threshold speed.

15. The vehicle of claim 9, wherein the discrete message based upon the preferred operating state for the electric machine comprises a message having a first frequency that is associated with the first command, a second frequency that is associated with the second command, and a third frequency that is associated with the third command.

16. The vehicle of claim 9, wherein the discrete message based upon the preferred operating state for the electric machine comprises a message having a first pulsewidth-modulated (PWM) duty cycle that is associated with the first command, a second PWM duty cycle that is associated with the second command, and a third PWM duty cycle that is associated with the third command.

* * * * *